(12) United States Patent
Leidel

(10) Patent No.: US 12,710,944 B2
(45) Date of Patent: *Aug. 18, 2026

(54) TARGET ARCHITECTURE DETERMINATION

(71) Applicant: Lodestar Licensing Group LLC, Evanston, IL (US)

(72) Inventor: John D. Leidel, McKinney, TX (US)

( * ) Notice: Subject to any disclaimer, the term of this patent is extended or adjusted under 35 U.S.C. 154(b) by 192 days.

This patent is subject to a terminal disclaimer.

(21) Appl. No.: 18/482,470

(22) Filed: Oct. 6, 2023

(65) Prior Publication Data

US 2024/0264813 A1 Aug. 8, 2024

Related U.S. Application Data

(63) Continuation of application No. 17/587,924, filed on Jan. 28, 2022, now Pat. No. 11,782,688, which is a continuation of application No. 17/063,285, filed on Oct. 5, 2020, now Pat. No. 11,237,808, which is a continuation of application No. 16/199,477, filed on Nov. 26, 2018, now Pat. No. 10,795,653, which is a continuation of application No. 15/097,764, filed on Apr. 13, 2016, now Pat. No. 10,140,104.

(60) Provisional application No. 62/147,341, filed on Apr. 14, 2015.

(51) Int. Cl.
*G06F 8/41* (2018.01)

(52) U.S. Cl.
CPC .................................... *G06F 8/447* (2013.01)

(58) Field of Classification Search
CPC ...................................................... G06F 8/447
See application file for complete search history.

(56) References Cited

U.S. PATENT DOCUMENTS

| | | | |
|---|---|---|---|
| 4,380,046 | A | 4/1983 | Fung |
| 4,435,792 | A | 3/1984 | Bechtolsheim |
| 4,435,793 | A | 3/1984 | Ochii |
| 4,727,474 | A | 2/1988 | Batcher |
| 4,843,264 | A | 6/1989 | Galbraith |
| 4,958,378 | A | 9/1990 | Bell |
| 4,977,542 | A | 12/1990 | Matsuda et al. |
| 5,023,838 | A | 6/1991 | Herbert |
| 5,034,636 | A | 7/1991 | Reis et al. |
| 5,201,039 | A | 4/1993 | Sakamura |
| 5,210,850 | A | 5/1993 | Kelly et al. |

(Continued)

FOREIGN PATENT DOCUMENTS

| | | |
|---|---|---|
| CN | 102141905 | 8/2011 |
| EP | 0214718 | 3/1987 |

(Continued)

OTHER PUBLICATIONS

Boyd et al., "On the General Applicability of Instruction-Set Randomization", Jul.-Sep. 2010, (14 pgs.), vol. 7, Issue 3, IEEE Transactions on Dependable and Secure Computing.

(Continued)

*Primary Examiner* — Phillip H Nguyen

(57) ABSTRACT

Examples of the present disclosure provide apparatuses and methods for target architecture determination. An example method comprises receiving an indication of a type of target architecture in a portion of source code and creating compiled code for the type of target architecture based on the indication.

17 Claims, 4 Drawing Sheets

(56) References Cited

U.S. PATENT DOCUMENTS 5,253,308 A 10/1993 Johnson
5,276,643 A 1/1994 Hoffmann et al.
5,325,519 A 6/1994 Long et al.
5,367,488 A 11/1994 An
5,379,257 A 1/1995 Matsumura et al.
5,386,379 A 1/1995 Ali-Yahia et al.
5,398,213 A 3/1995 Yeon et al.
5,440,482 A 8/1995 Davis
5,446,690 A 8/1995 Tanaka et al.
5,473,576 A 12/1995 Matsui
5,481,500 A 1/1996 Reohr et al.
5,485,373 A 1/1996 Davis et al.
5,506,811 A 4/1996 McLaury
5,615,404 A 3/1997 Knoll et al.
5,638,128 A 6/1997 Hoogenboom
5,638,317 A 6/1997 Tran
5,654,936 A 8/1997 Cho
5,678,021 A 10/1997 Pawate et al.
5,724,291 A 3/1998 Matano
5,724,366 A 3/1998 Furutani
5,751,987 A 5/1998 Mahant-Shetti et al.
5,774,728 A 6/1998 Breslau et al.
5,787,458 A 7/1998 Miwa
5,854,636 A 12/1998 Watanabe et al.
5,867,429 A 2/1999 Chen et al.
5,870,504 A 2/1999 Nemoto et al.
5,915,084 A 6/1999 Wendell
5,935,263 A 8/1999 Keeth et al.
5,986,942 A 11/1999 Sugibayashi
5,991,209 A 11/1999 Chow
5,991,785 A 11/1999 Alidina et al.
6,005,799 A 12/1999 Rao
6,009,020 A 12/1999 Nagata
6,092,186 A 7/2000 Betker et al.
6,122,211 A 9/2000 Morgan et al.
6,125,071 A 9/2000 Kohno et al.
6,134,164 A 10/2000 Lattimore et al.
6,147,514 A 11/2000 Shiratake
6,151,244 A 11/2000 Fujino et al.
6,157,578 A 12/2000 Brady
6,163,862 A 12/2000 Adams et al.
6,166,942 A 12/2000 Vo et al.
6,172,918 B1 1/2001 Hidaka
6,175,514 B1 1/2001 Henderson
6,181,698 B1 1/2001 Hariguchi
6,208,544 B1 3/2001 Beadle et al.
6,226,215 B1 5/2001 Yoon
6,301,153 B1 10/2001 Takeuchi et al.
6,301,164 B1 10/2001 Manning et al.
6,304,477 B1 10/2001 Naji
6,389,507 B1 5/2002 Sherman
6,418,498 B1 7/2002 Martwick
6,466,499 B1 10/2002 Blodgett
6,510,098 B1 1/2003 Taylor
6,563,754 B1 5/2003 Lien et al.
6,578,058 B1 6/2003 Nygaard
6,731,542 B1 5/2004 Le et al.
6,754,746 B1 6/2004 Leung et al.
6,768,679 B1 7/2004 Le et al.
6,807,614 B2 10/2004 Chung
6,816,422 B2 11/2004 Hamade et al.
6,819,612 B1 11/2004 Achter
6,894,549 B2 5/2005 Eliason
6,943,579 B1 9/2005 Hazanchuk et al.
6,948,056 B1 9/2005 Roth et al.
6,950,771 B1 9/2005 Fan et al.
6,950,898 B2 9/2005 Merritt et al.
6,956,770 B2 10/2005 Khalid et al.
6,961,272 B2 11/2005 Schreck
6,965,648 B1 11/2005 Smith et al.
6,985,394 B2 1/2006 Kim
6,987,693 B2 1/2006 Cernea et al.
7,020,017 B2 3/2006 Chen et al.
7,028,170 B2 4/2006 Saulsbury
7,045,834 B2 5/2006 Tran et al.
7,054,178 B1 5/2006 Shiah et al.
7,061,817 B2 6/2006 Raad et al.
7,079,407 B1 7/2006 Dimitrelis
7,173,857 B2 2/2007 Kato et al.
7,187,585 B2 3/2007 Li et al.
7,196,928 B2 3/2007 Chen
7,260,565 B2 8/2007 Lee et al.
7,260,672 B2 8/2007 Garney
7,372,715 B2 5/2008 Han
7,400,532 B2 7/2008 Aritome
7,406,494 B2 7/2008 Magee
7,447,720 B2 11/2008 Beaumont
7,454,451 B2 11/2008 Beaumont
7,457,181 B2 11/2008 Lee et al.
7,535,769 B2 5/2009 Cernea
7,546,438 B2 6/2009 Chung
7,562,198 B2 7/2009 Noda et al.
7,574,466 B2 8/2009 Beaumont
7,602,647 B2 10/2009 Li et al.
7,663,928 B2 2/2010 Tsai et al.
7,685,365 B2 3/2010 Rajwar et al.
7,692,466 B2 4/2010 Ahmadi
7,752,417 B2 7/2010 Manczak et al.
7,791,962 B2 9/2010 Noda et al.
7,796,453 B2 9/2010 Riho et al.
7,805,587 B1 9/2010 Van Dyke et al.
7,808,854 B2 10/2010 Takase
7,827,372 B2 11/2010 Bink et al.
7,869,273 B2 1/2011 Lee et al.
7,898,864 B2 3/2011 Dong
7,924,628 B2 4/2011 Danon et al.
7,937,535 B2 5/2011 Ozer et al.
7,957,206 B2 6/2011 Bauser
7,979,667 B2 7/2011 Allen et al.
7,996,749 B2 8/2011 Ding et al.
8,042,082 B2 10/2011 Solomon
8,045,391 B2 10/2011 Mohklesi
8,059,438 B2 11/2011 Chang et al.
8,095,825 B2 1/2012 Hirotsu et al.
8,117,462 B2 2/2012 Snapp et al.
8,164,942 B2 4/2012 Gebara et al.
8,208,328 B2 6/2012 Hong
8,213,248 B2 7/2012 Moon et al.
8,223,568 B2 7/2012 Seo
8,238,173 B2 8/2012 Akerib et al.
8,274,841 B2 9/2012 Shimano et al.
8,279,683 B2 10/2012 Klein
8,310,884 B2 11/2012 Iwai et al.
8,332,367 B2 12/2012 Bhattacherjee et al.
8,339,824 B2 12/2012 Cooke
8,339,883 B2 12/2012 Yu et al.
8,347,154 B2 1/2013 Bahali et al.
8,351,292 B2 1/2013 Matano
8,356,144 B2 1/2013 Hessel et al.
8,417,921 B2 4/2013 Gonion et al.
8,418,155 B2 4/2013 McAllister et al.
8,462,532 B1 6/2013 Argyres
8,484,276 B2 7/2013 Carlson et al.
8,495,438 B2 7/2013 Roine
8,503,250 B2 8/2013 Demone
8,526,239 B2 9/2013 Kim
8,533,245 B1 9/2013 Cheung
8,555,037 B2 10/2013 Gonion
8,561,037 B2 10/2013 Wallach et al.
8,599,613 B2 12/2013 Abiko et al.
8,605,015 B2 12/2013 Guttag et al.
8,625,376 B2 1/2014 Jung et al.
8,644,101 B2 2/2014 Jun et al.
8,650,232 B2 2/2014 Stortz et al.
8,677,322 B2 3/2014 Agarwal et al.
8,873,272 B2 10/2014 Lee
8,964,496 B2 2/2015 Manning
8,971,124 B1 3/2015 Manning
9,015,390 B2 4/2015 Klein
9,038,038 B1 5/2015 Jai et al.
9,047,193 B2 6/2015 Lin et al.
9,063,765 B2 6/2015 Fallows
9,165,023 B2 10/2015 Moskovich et al.
10,140,104 B2 11/2018 Leidel

(56) References Cited

U.S. PATENT DOCUMENTS 10,795,653 B2 10/2020 Leidel
11,237,808 B2 2/2022 Leidel
11,782,688 B2 10/2023 Leidel
2001/0007112 A1 7/2001 Porterfield
2001/0008492 A1 7/2001 Higashiho
2001/0010057 A1 7/2001 Yamada
2001/0028584 A1 10/2001 Nakayama et al.
2001/0043089 A1 11/2001 Forbes et al.
2002/0059355 A1 5/2002 Peleg et al.
2003/0167426 A1 9/2003 Slobodnik
2003/0222879 A1 12/2003 Lin et al.
2004/0073552 A1 4/2004 Bailey et al.
2004/0073592 A1 4/2004 Kim et al.
2004/0073773 A1 4/2004 Demjanenko
2004/0083467 A1 4/2004 Hanley et al.
2004/0085840 A1 5/2004 Vali et al.
2004/0095826 A1 5/2004 Perner
2004/0154002 A1 8/2004 Ball et al.
2004/0205289 A1 10/2004 Srinivasan
2004/0240251 A1 12/2004 Nozawa et al.
2005/0015557 A1 1/2005 Wang et al.
2005/0078514 A1 4/2005 Scheuerlein et al.
2005/0097399 A1 5/2005 Bliss et al.
2005/0097417 A1 5/2005 Agrawal et al.
2006/0047937 A1 3/2006 Selvaggi et al.
2006/0064670 A1 3/2006 Linebarger et al.
2006/0069849 A1 3/2006 Rudelic
2006/0146623 A1 7/2006 Mizuno et al.
2006/0149804 A1 7/2006 Luick et al.
2006/0181917 A1 8/2006 Kang et al.
2006/0215432 A1 9/2006 Wickeraad et al.
2006/0225072 A1 10/2006 Lari et al.
2006/0291282 A1 12/2006 Liu et al.
2007/0103986 A1 5/2007 Chen
2007/0171747 A1 7/2007 Hunter et al.
2007/0174560 A1* 7/2007 Kogge .................. G06F 9/5016
711/154
2007/0180006 A1 8/2007 Gyoten et al.
2007/0180184 A1 8/2007 Sakashita et al.
2007/0195602 A1 8/2007 Fong et al.
2007/0234316 A1 10/2007 Bayerlein
2007/0285131 A1 12/2007 Sohn
2007/0285979 A1 12/2007 Turner
2007/0291532 A1 12/2007 Tsuji
2008/0025073 A1 1/2008 Arsovski
2008/0037333 A1 2/2008 Kim et al.
2008/0052711 A1 2/2008 Forin et al.
2008/0109795 A1 5/2008 Buck et al.
2008/0137388 A1 6/2008 Krishnan et al.
2008/0165601 A1 7/2008 Matick et al.
2008/0178053 A1 7/2008 Gorman et al.
2008/0215937 A1 9/2008 Dreibelbis et al.
2009/0067218 A1 3/2009 Graber
2009/0106744 A1 4/2009 Li et al.
2009/0154238 A1 6/2009 Lee
2009/0154273 A1 6/2009 Borot et al.
2009/0204785 A1 8/2009 Yates et al.
2009/0254697 A1 10/2009 Akerib
2010/0067296 A1 3/2010 Li
2010/0091582 A1 4/2010 Vali et al.
2010/0149194 A1 6/2010 Yu et al.
2010/0153934 A1 6/2010 Lachner
2010/0172190 A1 7/2010 Lavi et al.
2010/0210076 A1 8/2010 Gruber et al.
2010/0226183 A1 9/2010 Kim
2010/0287542 A1 11/2010 Neft
2010/0293342 A1 11/2010 Morfey et al.
2010/0308858 A1 12/2010 Noda et al.
2010/0332895 A1 12/2010 Billing et al.
2011/0051523 A1 3/2011 Manabe et al.
2011/0063919 A1 3/2011 Chandrasekhar et al.
2011/0093662 A1 4/2011 Walker et al.
2011/0103151 A1 5/2011 Kim et al.
2011/0119467 A1 5/2011 Cadambi et al.
2011/0122695 A1 5/2011 Li et al.
2011/0140741 A1 6/2011 Zerbe et al.
2011/0219260 A1 9/2011 Nobunaga et al.
2011/0267883 A1 11/2011 Lee et al.
2011/0317496 A1 12/2011 Bunce et al.
2012/0005397 A1 1/2012 Lim et al.
2012/0017039 A1 1/2012 Margetts
2012/0023281 A1 1/2012 Kawasaki et al.
2012/0120705 A1 5/2012 Mitsubori et al.
2012/0134216 A1 5/2012 Singh
2012/0134225 A1 5/2012 Chow
2012/0134226 A1 5/2012 Chow
2012/0135225 A1 5/2012 Colas et al.
2012/0140540 A1 6/2012 Agam et al.
2012/0182798 A1 7/2012 Hosono et al.
2012/0195146 A1 8/2012 Jun et al.
2012/0198310 A1 8/2012 Tran et al.
2012/0246380 A1 9/2012 Akerib et al.
2012/0265964 A1 10/2012 Murata et al.
2012/0281486 A1 11/2012 Rao et al.
2012/0303627 A1 11/2012 Keeton et al.
2013/0003467 A1 1/2013 Klein
2013/0007712 A1* 1/2013 Agarwal ............. G06F 11/3624
717/124
2013/0019230 A1 1/2013 Nakanishi et al.
2013/0061006 A1 3/2013 Hein
2013/0107623 A1 5/2013 Kavalipurapu et al.
2013/0117541 A1 5/2013 Choquette et al.
2013/0124783 A1 5/2013 Yoon et al.
2013/0132702 A1 5/2013 Patel et al.
2013/0138646 A1 5/2013 Sirer et al.
2013/0163362 A1 6/2013 Kim
2013/0173888 A1 7/2013 Hansen et al.
2013/0173894 A1 7/2013 Yan et al.
2013/0185705 A1 7/2013 Kuesel et al.
2013/0205114 A1 8/2013 Badam et al.
2013/0219112 A1 8/2013 Okin et al.
2013/0227361 A1 8/2013 Bowers et al.
2013/0283122 A1 10/2013 Anholt et al.
2013/0286705 A1 10/2013 Grover et al.
2013/0326154 A1 12/2013 Haswell
2013/0332707 A1 12/2013 Gueron et al.
2013/0339928 A1 12/2013 Trofin et al.
2014/0089905 A1 3/2014 Hux et al.
2014/0185395 A1 7/2014 Seo
2014/0189679 A1 7/2014 Adams et al.
2014/0215185 A1 7/2014 Danielsen
2014/0250279 A1 9/2014 Manning
2014/0344934 A1 11/2014 Jorgensen
2015/0029798 A1 1/2015 Manning
2015/0042380 A1 2/2015 Manning
2015/0063052 A1 3/2015 Manning
2015/0078108 A1 3/2015 Cowles et al.
2015/0120987 A1 4/2015 Wheeler
2015/0134713 A1 5/2015 Wheeler
2015/0270015 A1 9/2015 Murphy et al.
2015/0279466 A1 10/2015 Manning
2015/0324290 A1 11/2015 Leidel
2015/0325272 A1 11/2015 Murphy
2015/0347108 A1 12/2015 Munshi et al.
2015/0356009 A1 12/2015 Wheeler et al.
2015/0356022 A1 12/2015 Leidel et al.
2015/0357007 A1 12/2015 Manning et al.
2015/0357008 A1 12/2015 Manning et al.
2015/0357019 A1 12/2015 Wheeler et al.
2015/0357020 A1 12/2015 Manning
2015/0357021 A1 12/2015 Hush
2015/0357022 A1 12/2015 Hush
2015/0357023 A1 12/2015 Hush
2015/0357024 A1 12/2015 Hush et al.
2015/0357047 A1 12/2015 Tiwari
2016/0062672 A1 3/2016 Wheeler
2016/0062673 A1 3/2016 Tiwari
2016/0062692 A1 3/2016 Finkbeiner et al.
2016/0062733 A1 3/2016 Tiwari
2016/0063284 A1 3/2016 Tiwari
2016/0064045 A1 3/2016 La Fratta
2016/0064047 A1 3/2016 Tiwari
2016/0098208 A1 4/2016 Willcock
2016/0098209 A1 4/2016 Leidel et al.

(56) References Cited

U.S. PATENT DOCUMENTS

| | | | |
|---|---|---|---|
| 2016/0306614 | A1 | 10/2016 | Leidel |
| 2019/0095182 | A1 | 3/2019 | Leidel |
| 2021/0019127 | A1 | 1/2021 | Leidel |
| 2022/0147330 | A1 | 5/2022 | Leidel |

FOREIGN PATENT DOCUMENTS

| | | |
|---|---|---|
| EP | 2026209 | 2/2009 |
| JP | H0831168 | 2/1996 |
| JP | 2009259193 | 3/2015 |
| KR | 10-0211482 | 8/1998 |
| KR | 10-2010-0134235 | 12/2010 |
| KR | 10-2013-0049421 | 5/2013 |
| WO | 2001065359 | 9/2001 |
| WO | 2010079451 | 7/2010 |
| WO | 2013062596 | 5/2013 |
| WO | 2013081588 | 6/2013 |
| WO | 2013095592 | 6/2013 |

OTHER PUBLICATIONS

Stojmenovic, "Multiplicative Circulant Networks Topological Properties and Communication Algorithms", (25 pgs.), Discrete Applied Mathematics 77 (1997) 281-305.

"4.9.3 Minloc and Maxloc", Jun. 12, 1995, (5pgs.), Message Passing Interface Forum 1.1, retrieved from http://www.mpi-forum.org/docs/mpi-1.1/mpi-11-html/node79.html.

Derby, et al., "A High-Performance Embedded DSP Core with Novel SIMD Features", Apr. 6-10, 2003, (4 pgs), vol. 2, pp. 301-304, 2003 IEEE International Conference on Accoustics, Speech, and Signal Processing.

Debnath, Biplob, Bloomflash: Bloom Filter on Flash-Based Storage, 2011 31st Annual Conference on Distributed Computing Systems, Jun. 20-24, 2011, 10 pgs.

Pagiamtzis, Kostas, "Content-Addressable Memory Introduction", Jun. 25, 2007, (6 pgs.), retrieved from: http://www.pagiamtzis.com/cam/camintro.

Pagiamtzis, et al., "Content-Addressable Memory (CAM) Circuits and Architectures: A Tutorial and Survey", Mar. 2006, (16 pgs.), vol. 41, No. 3, IEEE Journal of Solid-State Circuits.

International Search Report and Written Opinion for PCT Application No. PCT/US2013/043702, mailed Sep. 26, 2013, (11 pgs.).

Elliot, et al., "Computational RAM: Implementing Processors in Memory", Jan.-Mar. 1999, (10 pgs.), vol. 16, Issue 1, IEEE Design and Test of Computers Magazine.

Dybdahl, et al., "Destructive-Read in Embedded DRAM, Impact on Power Consumption," Apr. 2006, (10 pgs.), vol. 2, Issue 2, Journal of Embedded Computing-Issues in embedded single-chip multicore architectures.

Kogge, et al., "Processing In Memory: Chips to Petaflops," May 23, 1997, (8 pgs.), retrieved from: http://www.cs.ucf.edu/courses/cda5106/summer02/papers/kogge97PIM.pdf.

Draper, et al., "The Architecture of the DIVA Processing-In-Memory Chip," Jun. 22-26, 2002, (12 pgs.), ICS '02, retrieved from: http://www.isi.edu/~draper/papers/ics02.pdf.

Adibi, et al., "Processing-In-Memory Technology for Knowledge Discovery Algorithms," Jun. 25, 2006, (10 pgs.), Proceeding of the Second International Workshop on Data Management on New Hardware, retrieved from: http://www.cs.cmu.edu/~damon2006/pdf/adibi06inmemory.pdf.

U.S. Appl. No. 13/449,082, entitled, "Methods and Apparatus for Pattern Matching," filed Apr. 17, 2012, (37 pgs.).

U.S. Appl. No. 13/743,686, entitled, "Weighted Search and Compare in a Memory Device," filed Jan. 17, 2013, (25 pgs.).

U.S. Appl. No. 13/774,636, entitled, "Memory as a Programmable Logic Device," filed Feb. 22, 2013, (30 pgs.).

U.S. Appl. No. 13/774,553, entitled, "Neural Network in a Memory Device," filed Feb. 22, 2013, (63 pgs.).

U.S. Appl. No. 13/796,189, entitled, "Performing Complex Arithmetic Functions in a Memory Device," filed Mar. 12, 2013, (23 pgs.).

Muttreja et al., "Hybrid Simulation for Embedded Software Energy Estimation", Proceedings of the 2005 42nd Design Automation Conference, Jun. 13-17, 2005, Anaheim, CA, pp. 23-26.

Strumpen, Volker, "Compiler Technology for Portable Checkpoints", Laboratory for Computer Science, Massachusetts Institute of Technology, May 1998, pp. 1-11.

Bokan et al., "Adjustment of GCC Compiler Frontend for Embedded Processors", 2014 22nd Telecommunications Forum Telfor (TELFOR), Nov. 25-27, 2014, Belgrade, Serbia, 5 pgs.

Wells et al., "Architecture of an Open Object-Oriented Database Management System", Computer (IEEE Computer Society Publication), vol. 25, Issue 10, Oct. 1992, 10 pgs.

Ryoo et al., "Optimization Principles and Application Performance Evaluation of a Multithreaded GPU Using CUDA", Proceedings of the 13th ACM SINGPLAN Symposium on Principles and Practice of Parallel Programming, Feb. 2008, pp. 73-82.

Hong et al., "MapCG: Writing Parallel Program Portable Between CPU and GPU", 2010 19th International Conference on Parallel Architectures and Compilation Techniques, Sep. 11-15, 2010, Vienna, Austria, pp. 217-226.

Wang et al., "OpenMP Memkind: An Extension for Heterogenous Physical Memories", 2017 46th International Conference on Parallel Processing Workshops, Aug. 14-17, 2017. Bristol, UK, pp. 220-227.

Schwartz et al., "Incremental Compilation in Magpie", Jun. 1984, ACM SIGPLAN Notices, vol. 19, Issue 6, pp. 122-131.

Meissner, "Adding Named Address Space Support to the GCC Compiler", Proceedings of the GCC Developer's Summit, Jun. 8-10, 2009. Montreal, Canada, pp. 67-74.

Brockman et al., "Programming, Compilation, and Runtime Support for Processing-In-Memory Based Parallel Architectures", Feb. 17, 2003, pp. 1-16.

Beemster et al., "The Embedded C Extension to C", 2005, ACE Associated Compiler Experts, pp. 1-13.

Vanderbauwhede, et al., "A High-level Language for Programming a NoC-based Dynamic Reconfiguration Infrastructure", (Year: 2010).

"4.9.3 Minloc and Maxloc", Jun. 12, 1995, (5pgs.), Message Passing Interface Forum 1.1, retrieved from http://www.mpi-forum.org/docs/mpi-1.1/mpi-11-html/node79.html, pp. 1-5.

Boyd et al., "On the General Applicability of Instruction-Set Randomization", Jul.-Sep. 2010, (14 pgs.), vol. 7, Issue 3, IEEE Transactions on Dependable and Secure Computing, pp. 1-14.

Debnath, Biplob, Bloomflash: Bloom Filter on Flash-Based Storage, 2011 31st Annual Conference on Distributed Computing Systems, Jun. 20-24, 2011, pp. 635-644.

International Search Report and Written Opinion for PCT Application No. PCT/US2013/043702, dated Sep. 26, 2013, (11 pgs.).

Kanawati et al., "Adding Capability Checks Enhances Error Detection and Isolation in Object-Based Systems" (Year: 1993).

Schwartz et al., "OpenMP Memkind: An Extension for Heterogeneous Physical Memories" (Year: 1984).

* cited by examiner 470 492

| ADDRESS SPACE | TARGET ARCHITECTURE |
|---|---|
| 100 | PIM TYPE 1 |
| 101 | PIM TYPE 2 |
| 102 | PIM TYPE 3 |
| 0 | HOST PROCESSOR |

TARGET ARCHITECTURE DETERMINATION

PRIORITY INFORMATION

This application is a Continuation of U.S. application Ser. No. 17/587,924, filed Jan. 28, 2022, which will issue as U.S. Pat. No. 11,782,688, on Oct. 10, 2023, which is a Continuation of U.S. application Ser. No. 17/063,285, filed Oct. 5, 2020, which issued as U.S. Pat. No. 11,237,808, on Feb. 1, 2022, which is Continuation of U.S. application Ser. No. 16/199,477, filed Nov. 26, 2018, which issued as U.S. Pat. No. 10,795,653 on Oct. 6, 2020, which is a Continuation of U.S. application Ser. No. 15/097,764, filed Apr. 13, 2016, which issued as U.S. Pat. No. 10,140,104 on Nov. 27, 2018, which claims the benefit of U.S. Provisional Application No. 62/147,341, filed Apr. 14, 2015, the contents of which are included herein by reference.

TECHNICAL FIELD

The present disclosure relates generally to semiconductor memory apparatuses and methods, and more particularly, to apparatuses and methods related to target architecture determination.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Electronic systems often include a number of processing resources (e.g., one or more processors), which may retrieve and execute instructions and store the results of the executed instructions to a suitable location. A processor can comprise a number of functional units (e.g., herein referred to as functional unit circuitry such as arithmetic logic unit (ALU) circuitry, floating point unit (FPU) circuitry, and/or a combinatorial logic block, for example, which can execute instructions to perform logical operations such as AND, OR, NOT, NAND, NOR, and XOR logical operations on data (e.g., one or more operands).

A number of components in an electronic system may be involved in providing instructions to the functional unit circuitry for execution. The instructions may be generated, for instance, by a processing resource such as a controller and/or host processor. Data (e.g., the operands on which the instructions will be executed to perform the logical operations) may be stored in a memory array that is accessible by the functional unit circuitry. The instructions and/or data may be retrieved from the memory array and sequenced and/or buffered before the functional unit circuitry begins to execute instructions on the data. Furthermore, as different types of operations may be executed in one or multiple clock cycles through the functional unit circuitry, intermediate results of the operations and/or data may also be sequenced and/or buffered.

In many instances, the processing resources (e.g., processor and/or associated functional unit circuitry) may be external to the memory array, and data is accessed via a bus between the processing resources and the memory array to execute a set of instructions. Processing performance may be improved in a processor-in-memory (PIM) device, in which a processor may be implemented internal and/or near to a memory (e.g., directly on a same chip as the memory array). A PIM device may save time by reducing and/or eliminating external communications and may also conserve power. Data can be moved from the memory array to registers external to the memory array via a bus.

BRIEF DESCRIPTION OF THE DRAWINGS

FIG. 4 illustrates a table showing address space indicators and target architectures in accordance with a number of embodiments of the present disclosure.

DETAILED DESCRIPTION

Figure 1:
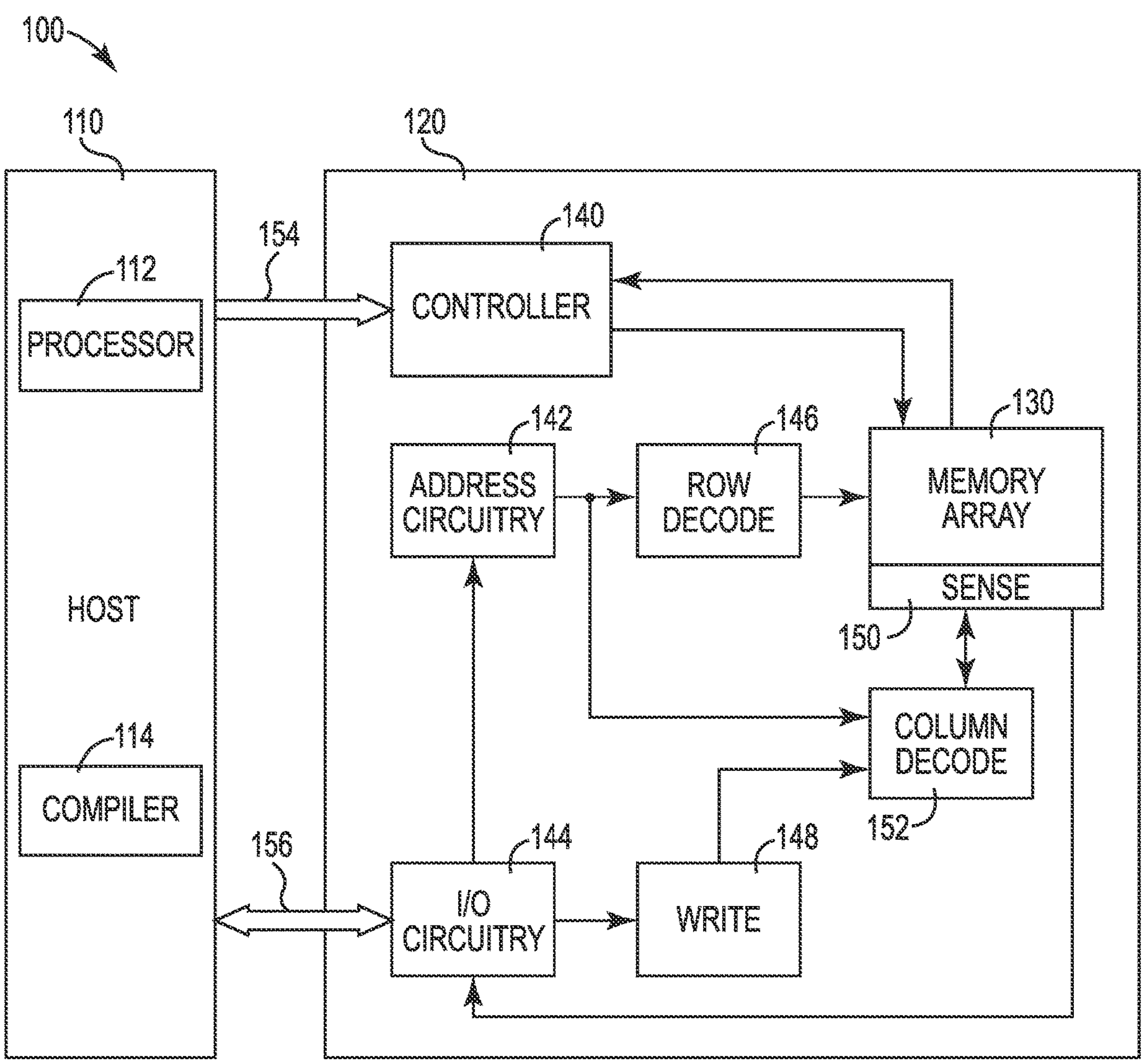
FIG. 1 is a block diagram of an apparatus in the form of a computing system including a memory device in accordance with a number of embodiments of the present disclosure.

Examples of the present disclosure provide apparatuses and methods for target architecture determination. An example method comprises receiving an indication of a type of target architecture in a portion of source code and creating compiled code for the type of target architecture based on the indication.

Computing architectures can include a variety of hardware and software configurations that can perform a variety of computing functions. The code that the various computing architectures can execute to perform their functions can vary among the various computing architectures. Therefore, code can be created for execution by a particular computing architecture (e.g., target architecture). The code for the target architecture can include instructions that are unique and/or particular to a target architecture.

In a number of embodiments, code for a target architecture can include sets of instructions that are specific to a particular target architecture, therefore code can be generated that use instructions specific to a target architecture. The code that is generated for a particular target architecture can be executed properly by the particular target architecture, but another target architecture may not be able to execute the code and/or may generate errors when executing the code. A target architecture that executes code with instructions that are specific to a particular target architecture can be a heterogeneous target architecture. A target architecture that executes code with instructions that are not specific to a particular target architecture can be a homogeneous target architecture.

In a number of embodiments, source code can include an attribute that indicates a type of target architecture for a portion of instructions in the source code by using a named address space that is associated with a type of target architecture. For example, source code can include a named address space that a compiler will recognize and create compiled code (e.g., assembly code and/or object code) for the type of target architecture indicated by the named address space. Also, source code can include a number of portions of source code that define attributes that include named address spaces. Compiled code can be created by a compiler for each of the portions of source code according to the type of target architecture indicated by the named address spaces.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, "a number of" a particular thing can refer to one or more of such things (e.g., a number of memory arrays can refer to one or more memory arrays).

The figures herein follow a numbering convention in which the first digit or digits correspond to the drawing figure number and the remaining digits identify an element or component in the drawing. Similar elements or components between different figures may be identified by the use of similar digits. For example, 270 may reference element "70" in FIG. 2, and a similar element may be referenced as 370 in FIG. 3. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense FIG. 1 is a block diagram of an apparatus in the form of a computing system 100 including a target architecture (e.g., memory device 120) in accordance with a number of embodiments of the present disclosure. The target architecture in FIG. 1 is a memory device 120. In a number of embodiments, target architectures can be memory devices (e.g., a PIM capable device), graphics processing units (GPUs), digital signal processors (DSPs), field programmable gate arrays (FPGAS), among other types of target architectures. As used herein, a memory device 120, a memory array 130, controller 140, complier 114, and/or sensing circuitry 150 might also be separately considered an "apparatus."

System 100 includes a host 110 coupled to memory device 120, which includes a memory array 130. System 100 can be a PIM capable system. Host 110 can be a host system such as a personal laptop computer, a desktop computer, a digital camera, a mobile telephone, or a memory card reader, among various other types of hosts. Host 110 can include a system motherboard and/or backplane and can include a number of processing resources (e.g., one or more processors, microprocessors, or some other type of controlling circuitry). The system 100 can include separate integrated circuits or both the host 110 and the device associated with a type of target architecture, memory device 120 in FIG. 1, can be on the same integrated circuit. The device associated with a type of target architectures that is part of system 100 and coupled to host 110 can be memory devices, graphics processing units (GPUs), digital signal processors (DSPs), field programmable gate arrays (FPGAS), The system 100 can be, for instance, a server system and/or a S performance computing (HPC) system and/or a portion thereof. Although the example shown in FIG. 1 illustrates a system having a Von Neumann architecture, embodiments of the present disclosure can be implemented in non-Von Neumann architectures (e.g., a Turing machine), which may not include one or more components (e.g., CPU, ALU, etc.) often associated with a Von Neumann architecture.

The host 110 can include a processor 112 and a compiler 114. Processor 112 can comprise a number of functional units such as arithmetic logic unit (ALU) circuitry, floating point unit (FPU) circuitry, and/or a combinatorial logic block, for example, which can comprise a number of registers and can be used to execute instructions by performing logical operations such as AND, OR, NOT, NAND, NOR, and XOR logical operations on operands. For example, the number of functional units, which may be referred to as functional unit circuitry, may be used to perform arithmetic operations such as addition, subtraction, multiplication, and/or division on operands. In many instances, the processing resources may be external to memory device 120 comprising memory array 130 in which the instructions to be executed (e.g., the executable file) are stored. The instructions to be executed can be accessed (e.g., retrieved from the memory array 130) via a bus 154 between the processor 112 and the memory device 120, for example.

Compiler 114 can include a non-transitory computer readable medium that stores instructions executable by processor 112 to perform various embodiments of the present disclosure. For example, compiler 114 can include instructions to identify target architectures and to create compile code for particular types of target architectures. Also, compiler 114 can include a table that correlates named address spaces with types of target architectures.

Compiler 114 can receive source code and use the processor 112 to generate compiled code based on the source code. The compiler 114 can include instructions stored on a non-transitory computer readable medium that can be executed by the processor to generate the compiled code. Compiler 114 can recognize commands from the source code that are associated with a particular architecture and create compiled code for the particular architecture.

For clarity, the system 100 has been simplified to focus on features with particular relevance to the present disclosure. The memory array 130 can be a DRAM array, SRAM array, STT RAM array, PCRAM array, TRAM array, processor in memory (PIM) array, RRAM array, NAND flash array, and/or NOR flash array, for instance. The array 130 can comprise memory cells arranged in rows coupled by access lines (which may be referred to herein as word lines or select lines) and columns coupled by sense lines (which may be referred to herein as digit lines or data lines). Although a single array 130 is shown in FIG. 1, embodiments are not so limited. For instance, memory device 120 may include a number of arrays 130 (e.g., a number of banks of DRAM cells). An example DRAM array is described in association with FIGS. 2 and 3.

The memory device 120 includes address circuitry 142 to latch address signals provided over an I/O bus 156 (e.g., a data bus) through I/O circuitry 144. Address signals are received and decoded by a row decoder 146 and a column decoder 152 to access the memory array 130. Data can be read from memory array 130 by sensing voltage and/or current changes on the sense lines using sensing circuitry 150. The sensing circuitry 150 can read and latch a page (e.g., row) of data from the memory array 130. The I/O circuitry 144 can be used for bi-directional data communication with host 110 over the I/O bus 156. The write circuitry 148 is used to write data to the memory array 130.

Controller 140 decodes signals provided by control bus 154 from the host 110. These signals can include chip enable signals, write enable signals, and address latch signals that are used to control operations (e.g., PIM operations) performed on the memory array 130, including data read, data write, and data erase operations. In various embodiments, the control circuitry 140 is responsible for executing instructions from the host 110. The controller 140 can be a state machine, a sequencer, or some other type of controller.

In a number of embodiments, the sensing circuitry 150 can comprise a number of sense amplifiers and a number of compute components, which may comprise a latch serving as a Comp_Compulator and can be used to perform logical operations (e.g., on data associated with complementary sense lines).

Figure 2:
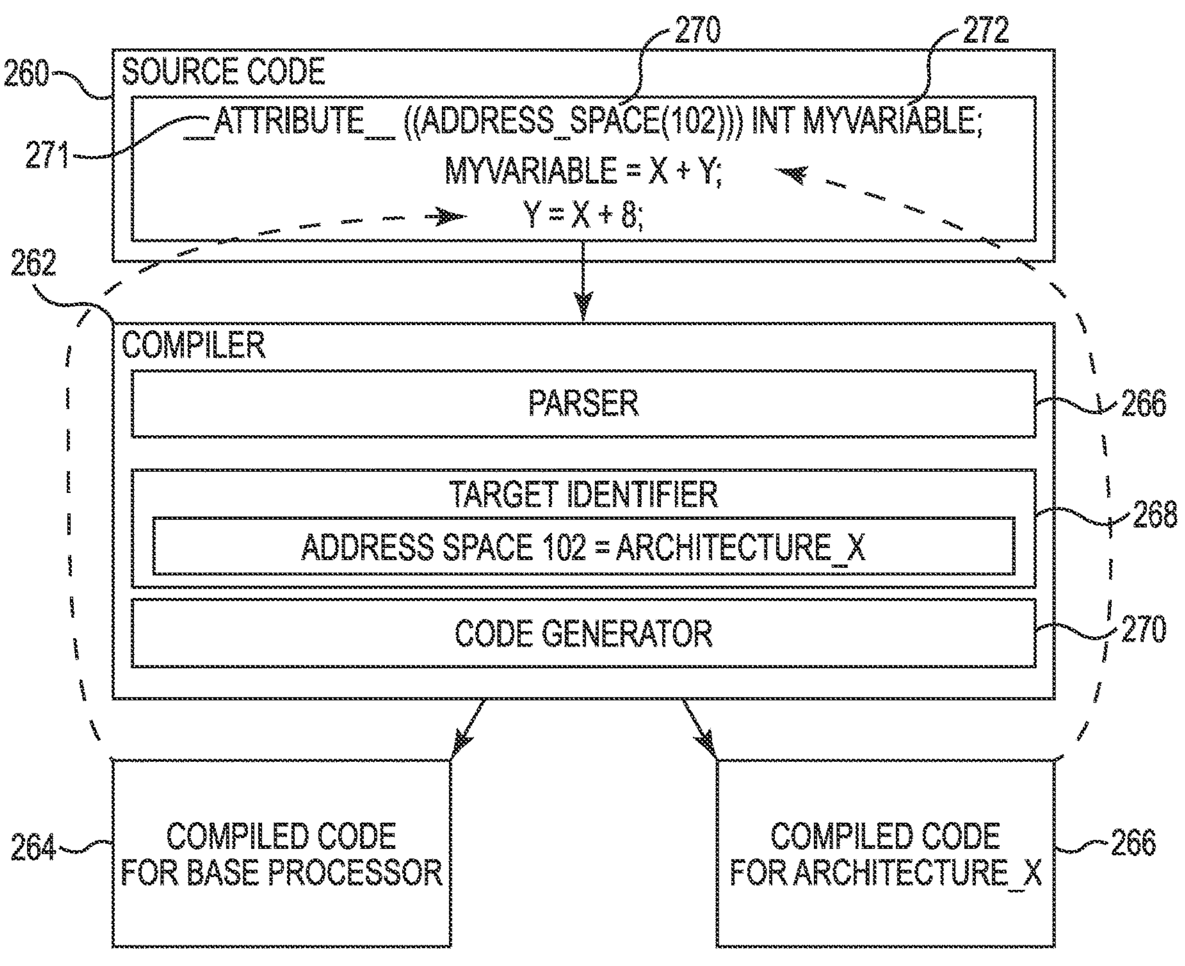
FIG. 2 illustrates a block diagram of a heterogeneous target architecture system in accordance with a number of embodiments of the present disclosure.

FIG. 2 illustrates a block diagram of a heterogeneous target architecture system in accordance with a number of embodiments of the present disclosure. In FIG. 2, source code 260 illustrates an example portion of source code that can be used to determine a type of target architecture for the instruction in the source code. Source code 260 defines an attribute 271 that includes a named address space 270 to indicate the type of target architecture for the instructions of this portion of the source code 260. The named address space 270 can include an integer to indicate on which type of target architecture the instructions will be used. The address space 270 in FIG. 2 is address space "102". The various target architectures can include graphics processing units (GPUs), processor in memory (PIM) devices, digital signal processors (DSPs), field programmable gate arrays (FPGAS), among other architectures. Also, a named address space can be assigned to various versions of an architecture. For example, a first named address space can be assigned to a PIM device having a first storage capacity and a second named address space can be assigned to PIM device having a second storage capacity. Also, a first named address space can be assigned to horizontal operations on a PIM device and a second named address space can be assigned to vertical operations on a PIM device. Each of the devices having a different architecture can be coupled via a host that includes a host processor, such as processor 112 in FIG. 1. The attribute can also include variable 272. Variable 272, indicated as "MyVariable" in FIG. 2, can be associated with the instructions for the portion of the source code that has named address space 270.

In FIG. 2, a compiler 262 can receive and interpret the source code 260. The compiler 262 can include parser 266 to separate the source code in a number of portions based on the named address space of the source code 260. The parser 266 can use a number of rules, which are described below in association with FIG. 3, to group portions of source code together that can be compiled into compiled code for a particular architecture indicated by the named address space. For example, parser 266 can separate the source code 260 from other portions of source code (not shown) based on the named address space 270 of the source code, which indicates source code 260 is for the type of target architecture indicated by named address space "102".

Once the parser 266 has separated the source code based on the named address spaces of the source code, the target identifier 268 can determine which target architecture is associated with the named address space 270 of the source code 260. The target identifier 268 can use a table, such as table 495 from FIG. 4 and described below in association with FIG. 4, to correlate the type of target architecture associated with the named address space 270. Code generator 270 can include instructions for creating compiled code that is specific for the various target architectures associated with a named address space 270. In FIG. 2, the address space "102" is associated with "Architecture_X", therefore code generator 270 can create compiled code that includes instructions for the target architecture of "Architecture_X".

Once the target identifier 268 has identified the target architecture for the source code, the code generator 270 can create compiled code for the instructions from the source code. The code generator 270 can create compiled code 264 and compiled code 266. The compiled code 264 can include instructions for a base processor. The source code (not shown) from which the compiled code 264 was created can include an address space indicator of "0" or not include an address space indicator. The compiled code 266 can include instructions for Architecture_X, as indicated by named address space 270 in source code 260. Code generator 270 can include instructions for creating code that is specific for the various target architectures associated with an address space indicator 270.

Figure 3:
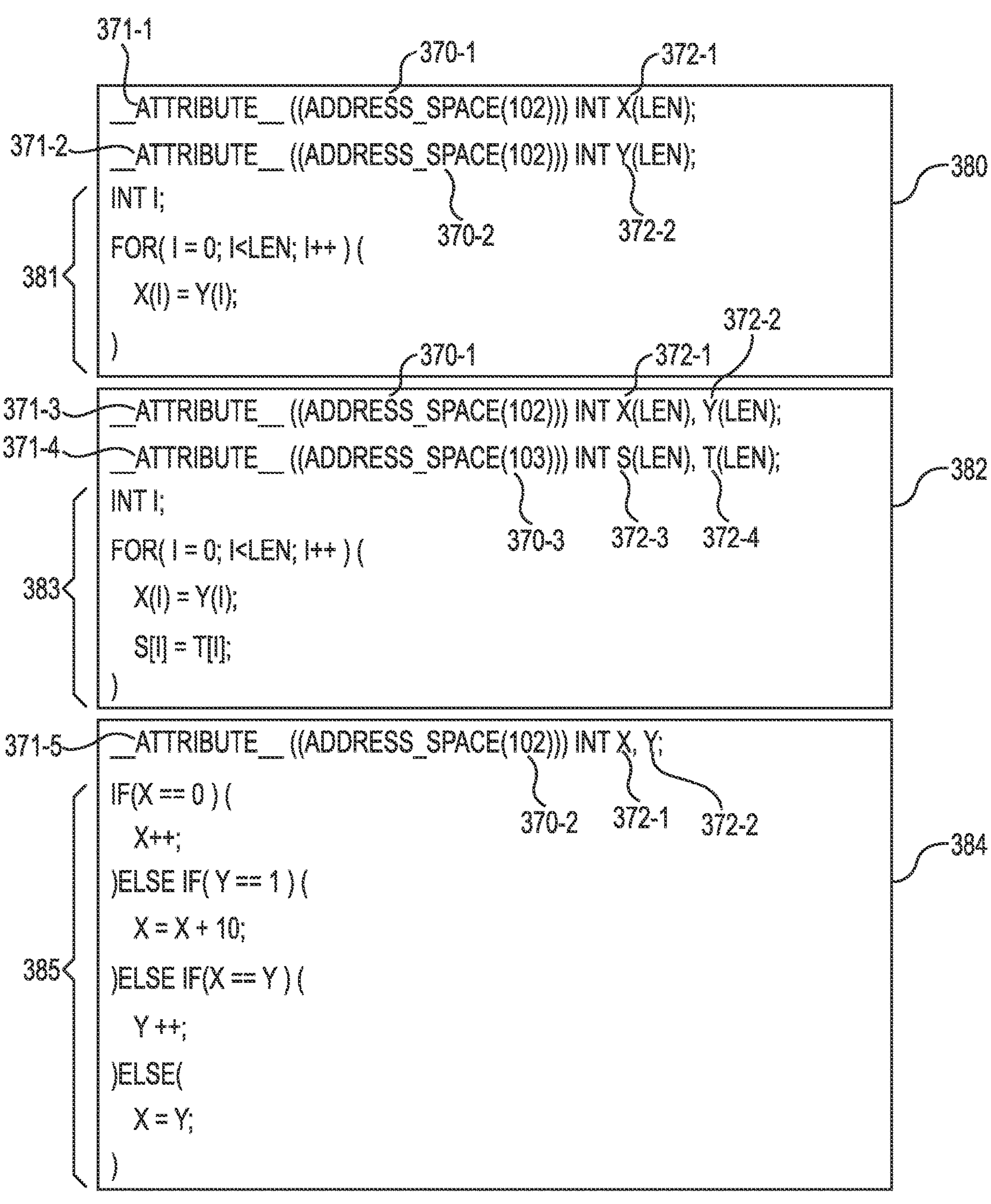
FIG. 3 illustrates examples of source code for heterogeneous target architecture determination in accordance with a number of embodiments of the present disclosure.

FIG. 3 illustrates examples of source code for target architecture determination in accordance with a number of embodiments of the present disclosure. Examples 380, 382, and 384 in FIG. 3 each include example of source code that can be compiled according to a number of embodiments of the present disclosure. Example 380 illustrates source code that can be compiled together because the attributes include named address spaces that are associated with the same type of target architecture. Example 382 illustrates source code that can be compiled into two separate portions of compiled code because the attributes include named address spaces that are associated with different types of target architectures. Example 384 illustrates source code that includes complex flow control statements that can be compiled together because the attribute includes a single named address space associated with a particular type of target architecture.

In example 380, attributes 371-1 and 371-2 both include named address space 370-1, defined by integer "102". Therefore, source code portion 381 having variables 372-1 and 372-2 in the argument, both associated with named address space 370-1, can be compiled together into compiled code that uses instructions associated with a type of target architecture correlated to named address space "102". The source code in example 380 includes a first attribute 371-1 with address space indicator 370-1, which is "102" in FIG. 3, having an associated variable 372-1, which is "XX" in FIG. 3; and a second attribute 371-2 with address space indicator 370-1, which is "102" in FIG. 3, having an associated variable 372-2, which is "YY" in FIG. 3. In example 380, the first attribute 371-1 and the second attribute 371-2 both have the same address space indicator 370-1, therefore the source code portion 381 can be compiled together by a compiler into compiled code for the target architecture associated with address space indicator 370-1. The compiled code based on the source code from example 380 can use variables 372-1 and 372-2 defined in the first and second attributes 371-1 and 371-2.

In example 382, attribute 371-3 includes named address space 370-1 and 370-2, defined by integer "102", and attribute 371-4 includes named address space 370-3, defined by integer "103". Therefore, source code portion 383 having variables 372-1, 372-2, 372-3, and 372-4 in the argument, associated with named address spaces 370-1 and 370-3, can be compiled into separate portions of compiled code, each using instructions associated with a particular type of target architecture. The source code in example 382 includes a first attribute with address space indicator 370-1, which is "102" in FIG. 3, having associated variables 372-1, which is "X" in FIG. 3, and 372-2, which is "Y" in FIG. 3; and a second attribute with address space indicator 370-3, which is "103" in FIG. 3, having associated variables 372-3, which is "S" in FIG. 3, and 372-4, which is "T" in FIG. 3. In example 382, the first attribute and the second attribute have different address space indicators, 370-1 and 370-3, therefore the source code portion 383 can be compiled by a compiler into two different portions of compiled code. A first portion can be compiled for target architecture associated with address space 370-1 and a second portion can be complied for the target architecture associated with address space 370-3.

In example 384, attribute 371-5 includes named address space 370-1, defined by integer "102". Source code portion 385 includes complex flow control statements that include variables 372-1 and 372-2 in the argument, both associated with named address space 370-1, can be compiled together into compiled code that uses instructions associated with a type of target architecture correlated to named address space "102". The source code in example 384 includes a first attribute with address space indicator 370-1, which is "102" in FIG. 3, having associated variables 372-1, which is "X" in FIG. 3, and 372-2, which is "Y" in FIG. 3. In example 384, source code portion 385 includes instructions having complex flow control. In a number of embodiments, when source code that includes complex flow control instructions is associated with a single target architecture, as indicated by an attribute having a single named address space, the source code can be compiled together into compiled code. In example 384, the complex flow control instructions, such as if-then-else statements and switch statements, among others, can be compiled together into compiled code for the target architecture associated with named address space 370-1 in response to the source code associating only named address space 370-1 with the complex flow control instructions in source code portion 385 of example 384.

FIG. 4 illustrates a table showing address space indicators and target architectures in accordance with a number of embodiments of the present disclosure. Table 495 in FIG. 4 can include a named address space 470 and a target architecture 492. In Table 495, named address space 470-1, which is "100" in FIG. 4, can be associated with PIM type 1 492-1 target architecture, named address space 470-2, which is "101" in FIG. 4, can be associated with PIM type 2 492-2 target architecture, named address space 470-3, which is "102" in FIG. 4, can be associated with PIM type 3 492-3 target architecture, and named address space 470-4, which is "0" in FIG. 4, can be associated with host processor 492-4 target architecture. In a number of embodiments, the target architectures that are identified and associated with a named address space can be a number of heterogeneous target architectures that include one or more disparate instruction set architectures (e.g., instructions that are only properly executed by a particular target architecture). Table 495 can be stored in a compiler, such as in the target identifier 268 on compiler 262 in FIG. 2. Table 495 can be used by a compiler to determine which target architecture will be the basis for creating compiled code from source code.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:

a processor;

a parser, wherein the processor is coupled to the parser and is configured to cause the parser to identify a first portion of source code suitable for a processor-in-memory (PIM) device coupled to the apparatus and identify a second portion of source code suitable for the processor based on a named address space defined in the source code; and a code generator, wherein the processor is coupled to the code generator and is configured to cause the code generator to create a first portion of compiled code that includes first instructions for the PIM device based on the first portion of the source code and create a second portion of compiled code that includes second instructions for the processor based on the second portion of the source code.

2. The apparatus of claim 1, wherein the parser separates the source code into a number of portions based on a number of named address spaces including the named address space defined in the source code.

3. The apparatus of claim 1, wherein the first portion of complied code includes homogeneous instructions for the PIM device.

4. The apparatus of claim 1, wherein the PIM device is configured to execute only the first portion of compiled code.

5. The apparatus of claim 1, wherein the processor is configured to execute only the second portion of compiled code.

6. A method, comprising:

creating, via a compiler, a first portion of compiled code that includes instructions for a processor-in-memory device (PIM) device based on a first portion of source code; and creating, via the compiler, a second portion of compiled code that includes instructions for a base processor based on a second portion of the source code, wherein the second portion of compiled code includes a number of instructions for the base processor.

7. The method of claim 6, further including executing the first portion of compiled code by the PIM device.

8. The method of claim 6, further including executing the second portion of compiled code with the base processor.

9. The method of claim 6, wherein the first portion of compiled code includes a number of instructions for the PIM device.

10. The method of claim 6, wherein creating the first portion of compiled code includes determining that the first portion of source code is suitable for the PIM device based on a named address space defined in the first portion of the source code.

11. The method of claim 10, wherein the named address space includes an integer.

12. The method of claim 6, wherein the first portion of compiled code includes a number of homogeneous instructions.

13. The method of claim 6, further comprising creating a third portion of compiled code that includes instructions for a different target architecture.

14. The method of claim 13, wherein the third portion of compiled code is created in response to the source code having different named address spaces.

15. An apparatus, comprising:

a processor; and a code generator, wherein the processor is coupled to the code generator and is configured to cause the code generator to:

create first compiled code from a first portion of source code based on a named address space defined in the source code, the first compiled code comprising instructions for a processor-in-memory (PIM) device; and create second compiled code from a second portion of the source code, the second compiled code comprising instructions for the processor.

16. The apparatus of claim 15, wherein the processor is coupled to a parser and the processor is configured to cause the parser to separate the first portion of source code from other portions of source code based on the named address space defined in the source code.

17. The apparatus of claim 16, wherein the processor is configured to cause the code generator to create the second compiled code from the second portion of the source code for the processor based on another named address space defined in the source code.

* * * * *